US007922363B2

(12) United States Patent
Yang et al.

(10) Patent No.: US 7,922,363 B2
(45) Date of Patent: Apr. 12, 2011

(54) LED LAMP

(75) Inventors: Ri-Lang Yang, Shenzhen (CN); Guang Yu, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, New Taipei (TW)

( * ) Notice: Subject to any disclaimer, the term of this patent is extended or adjusted under 35 U.S.C. 154(b) by 119 days.

(21) Appl. No.: 12/391,168

(22) Filed: Feb. 23, 2009

(65) Prior Publication Data

US 2010/0053963 A1 Mar. 4, 2010

(30) Foreign Application Priority Data

Aug. 27, 2008 (CN) .......................... 2008 1 0304235

(51) Int. Cl.
*F21V 29/00* (2006.01)
*B60Q 1/06* (2006.01)

(52) U.S. Cl. ........................................ 362/294; 362/373

(58) Field of Classification Search .................. 362/294, 362/373

See application file for complete search history.

(56) References Cited

U.S. PATENT DOCUMENTS

| | | | | |
|---|---|---|---|---|
| 6,525,668 | B1 * | 2/2003 | Petrick | 340/815.45 |
| 7,093,958 | B2 * | 8/2006 | Coushaine | 362/249.02 |
| 7,513,653 | B1 * | 4/2009 | Liu et al. | 362/294 |
| 7,585,090 | B2 * | 9/2009 | Wu | 362/249.02 |
| 2005/0174780 | A1 * | 8/2005 | Park | 362/294 |
| 2007/0285926 | A1 * | 12/2007 | Maxik | 362/294 |
| 2008/0002410 | A1 * | 1/2008 | Burton et al. | 362/294 |
| 2009/0073688 | A1 * | 3/2009 | Patrick | 362/232 |
| 2009/0073689 | A1 * | 3/2009 | Patrick | 362/234 |

* cited by examiner

*Primary Examiner* — Jong-Suk (James) Lee
*Assistant Examiner* — David J Makiya
(74) *Attorney, Agent, or Firm* — Frank R. Niranjan

(57) ABSTRACT

An LED lamp includes a base, a heat sink placed on a top surface of the base and a plurality of LED modules mounted on the heat sink. The base has a base plate, an engaging flange extending upwards from an edge of the base plate and a plurality of projecting vanes formed on a bottom of the base plate. The heat sink surrounded by the engaging flange comprises a core, a plurality of branches extending outwards from an outer circumference of the core and a plurality of fins formed on two opposite sides of each branch. Each branch defines an inclined surface on a top thereof and has a height gradually decreased along a direction outwards from the core. Each LED module has a printed circuit board mounted on the inclined surface of a corresponding branch of the heat sink.

18 Claims, 4 Drawing Sheets

LED LAMP

BACKGROUND OF THE INVENTION

1. Field of the Invention

The disclosure relates to an LED (light-emitting diode) lamp, and more particularly to an improved LED lamp capable of illuminating a large area.

2. Description of Related Art

An LED lamp utilizes LEDs as a source of illumination, in which current flowing in one direction through a junction region comprising two different semiconductors results in electrons and holes coupling at the junction region and generating a light beam. The LED is resistant to shock and has an almost endless lifetime under specific conditions, making it a popular, cost-effective and high quality replacement for incandescent and fluorescent lamps.

Known implementations of LED modules in an LED lamp make use of a plurality of individual LEDs to generate light that is ample and of satisfactory spatial distribution. The large number of LEDs, however, increases price and power consumption of the module. Considerable heat is also generated, which, if not adequately addressed at additional expense, impacts LED lamp reliability.

Further, since the LEDs are generally arranged on a printed circuit board having a flattened surface, illumination is distributed at a wide variety of spatial angles with sharp differences in intensity and brightness, making it unsuitable for environments requiring even and broad illumination. Finally, the LEDs mounted on the flattened surface of the printed circuit board cannot have a large area of illumination.

What is needed, therefore, is an LED lamp which can overcome the limitations described.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION OF THE INVENTION

Figure 1:
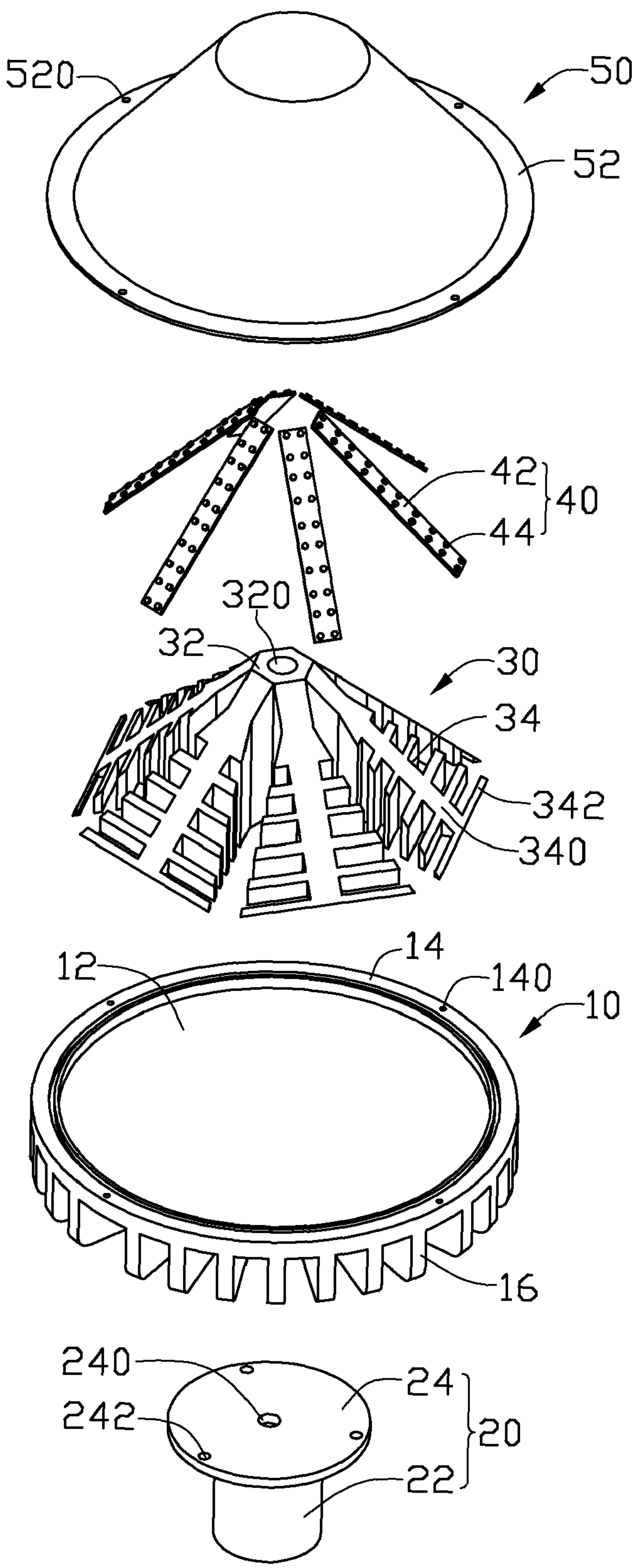
FIG. 1 is an isometric, exploded view of an LED lamp in accordance with an exemplary embodiment of the disclosure.
Figure 2:
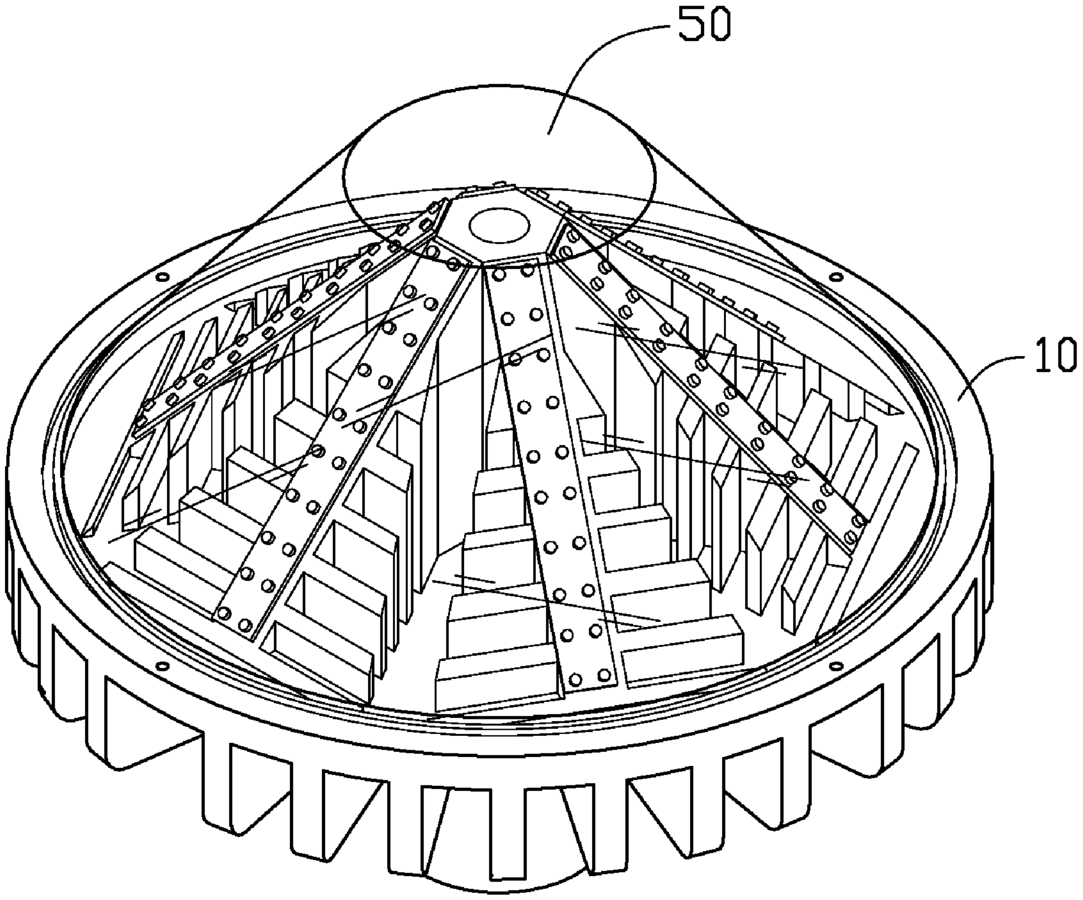
FIG. 2 is an assembled view of the LED lamp of FIG. 1.
Figure 3:
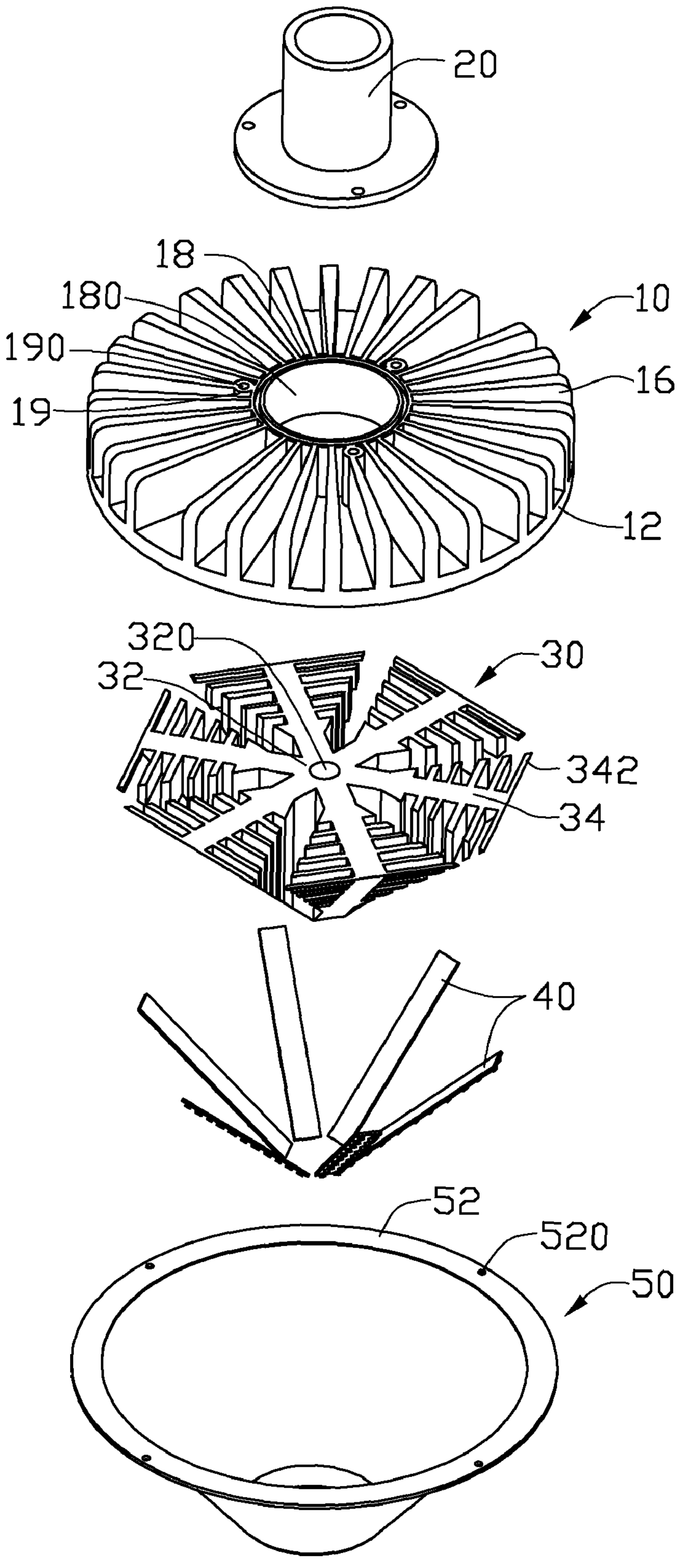
FIG. 3 is an inverted view of the LED lamp of FIG. 1.
Figure 4:
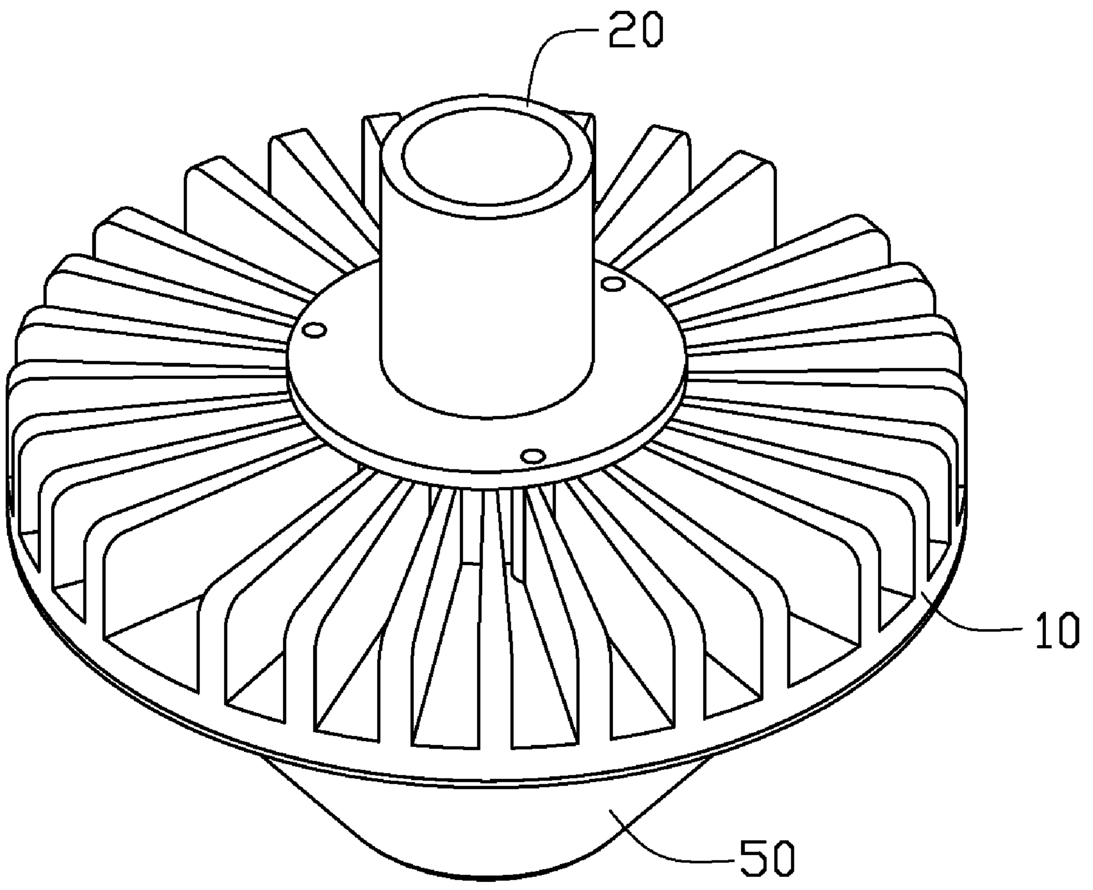
FIG. 4 is an inverted view of the LED lamp of FIG. 2.

Referring to FIGS. 1-4, an LED lamp in accordance with an exemplary embodiment is illustrated. The LED lamp, which is configured for providing illumination indoors and outdoors, includes a base 10, a mounting member 20 coupled to a bottom of the base 10, a heat sink 30 sitting on a top surface of the base 10, a plurality of LED modules 40 mounted on an outer surface of the heat sink 30 and a cover 50 engaging with the top of the base 10 to enclose the heat sink 30 and the LED modules 40 therein.

The base 10 is made of a metal having a high conductivity, such as aluminum, and comprises a circular base plate 12, an annular engaging flange 14 extending upwardly from an outer edge of the base plate 12, a receiving cylinder 18 (see FIG. 3) extending downwardly from a center of a bottom surface of the base plate 12 and a plurality of projecting vanes 16 arranged on the bottom surface of the base plate 12 around the receiving cylinder 18. The engaging flange 14 defines a plurality of engaging holes 140 therein, two neighboring ones of which are spaced from each other with a constant distance. The engaging holes 140 are configured for engagingly receiving screws (not shown) to secure the cover 50 thereon. The receiving cylinder 18 is perpendicular to the bottom surface of the base plate 12 and defines a receiving room 180 therein for accommodating related electronic components such as selenium rectifier and controlling circuit board. The projecting vanes 16 extending radially and outwards from an outer circumference of the receiving cylinder 18, are perpendicular to the base plate 12 and symmetrical to each other relative to the center of the base plate 12. A plurality of fixing posts 19 extending perpendicularly from the bottom surface of the base plate 12, are joined to the outer circumference of the receiving cylinder 18. Each fixing post 19 defines a fixing hole 190 therein.

The mounting member 20 comprises a circular mounting plate 24 and a sleeve 22 extending downwardly from a central part of a bottom of the mounting plate 24. The mounting plate 24 has a diameter the same as that of the receiving cylinder 18 of the base 10 for fitly engaging with a lower end of the receiving cylinder 18. A plurality of through holes 242 for respectively in alignment with the fixing holes 190 of the base 10, are defined in the mounting plate 24 and adjacent to an outer edge of the mounting plate 24. The sleeve 22 is for engagingly receiving an end of a holding pole (not shown) therein to hold the LED lamp in position when in use. The mounting member 20 and the base 10 are coupled together by screws extended through the through holes 242 of the mounting plate 24 and screwed into the corresponding fixing holes 190 of the base 10. A circular hole 240 is defined in the center of the mounting plate 24, allowing electrical wires (now shown) to extend into the LED lamp.

The heat sink 30 is integrally made of metallic material with high heat conductivity such as copper or aluminum, and comprises a core 32, a plurality of branches 34 extending outwards from an outer circumference of the core 32 and a plurality of fins 342 formed on two opposite sides of each branch 34. The core 32 is hexagonal prism-shaped (though it is not limited to this shape) and has six sidewalls (not labeled) on the outer circumference thereof. The core 32 defines a hollow hole 320 therein along an axis thereof for lightening a weight of the heat sink 30 and facilitating an extension of the electrical wires to be electrically connected to the LED modules 40.

The branches 34 each are a right-angled triangular in profile and extend perpendicularly and radially, outwardly from a corresponding one of the six sidewalls of the core 32. Each branch 34 has an inclined surface 340 corresponding to a bevel edge of the triangle in profile, whereby a distance between the inclined surface 340 and the core 32 gradually increases from the top end to the bottom end of the core 32. Each inclined surface 340 is inclined relative to the core 32 with a same angle. The fins 342 extending laterally from the two opposite lateral sides of each branch 34, are perpendicular to the branch 34 and symmetrical to each other relative to the branch 34. The fins 342 are increased in length and decreased in height along a direction outwards from the core 32. The fins 340 have top surfaces coplanar with the inclined surface 340 of the corresponding branch 34. Bottom surfaces of the branches 34, bottom surfaces of the fins 342 and a bottom surface of the core 32 are coplanar with each other and combined together to constitute a flat bottom surface of the heat sink 30. The heat sink 30 is placed on a top surface of the base plate 12 and surrounded by the engaging flange 14.

The LED modules 40 each comprise an elongated printed circuit board 42 and a plurality of LED components 44 linearly arranged thereon, along a length thereof. The LED components 44 are grouped into two columns on each printed circuit board 42. Each of the LED modules 40 is attached to the inclined surface 340 of one of the branches 34 of the heat sink 30.

The cover 50 has a shape of a frustum and is made of transparent/translucent plastic or glass material. An annular flange 52 extends outwards and horizontally from a bottom end of the cover 50 and has a shape consistent with that of the engaging flange 14 of the base 10. A plurality of extending holes 520 for respectively in alignment with the engaging holes 140 of the engaging flange 14, are defined in the annular flange 52. The cover 50 is coupled to the base 10 by the screws extended through the extending holes 520 of the annular flange 52 and screwed into the engaging holes 140 of the engaging flange 14 of the base 10.

In use, the LED modules 40 are mounted on the inclined surfaces 340 of the heat sink 30 and directed to different orientations; moreover, the LEDs components 44 of the LED modules 40, located at different levels, allow light generated thereby to be respectively directed to different orientations of the LED lamp and evenly distributed, without local concentration. The LED lamp is thus able to meet a specified requirement of use. Further, heat generated by the LED modules 40 is timely absorbed by the branches 34 and distributed evenly over the fins 342 and the projecting vanes 16 to dissipate into ambient air.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An LED lamp comprising: a heat sink comprising a core, a plurality of branches fixed on the core and extending outwards from an outer circumference of the core and a plurality of fins formed on two opposite sides of each branch, each branch defining an inclined surface on a top thereof, a distance between the inclined surface and the core gradually increasing from a first end of the core to a second end thereof which is opposite to the first end of the core, wherein the fins are decreased in height along a direction outwards from the core and have top surfaces thereof coplanar with the inclined surface; and an LED module mounted on the inclined surface of the each branch of the heat sink.

2. The LED lamp as claimed in claim 1, wherein the core is prism-shaped and has a plurality of sidewalls on the outer circumference thereof, the branches respectively extending perpendicularly and outwardly from the sidewalls of the core.

3. The LED lamp as claimed in claim 1, wherein the fins are increased in length along the direction outwards from the core and have bottom surfaces coplanar with a bottom surface of the core and bottom surfaces of the branches.

4. The LED lamp as claimed in claim 3, wherein the fins are perpendicular to the each branch and symmetrical to each other relative to the each branch.

5. The LED lamp as claimed in claim 1, wherein the inclined surface of the each branch is inclined to the core with a same angle.

6. The LED lamp as claimed in claim 1 further comprising a base having a base plate, an engaging flange extending upwards from an outer edge of a top surface of the base plate and a plurality of projecting vanes arranged on a bottom surface of the base plate opposite to the top surface, wherein the heat sink is disposed on the top surface of the base plate opposite to the engaging flange and surrounded by the engaging flange.

7. The LED lamp as claimed in claim 6, wherein the base further comprises a receiving cylinder formed on the bottom surface of the base plate, wherein the receiving cylinder defines a receiving room therein and extends downwardly from a central portion of the bottom surface of the base plate, the projecting vanes extending radially outwardly from an outer circumference of the receiving cylinder.

8. The LED lamp as claimed in claim 7 further comprising a mounting member, wherein the mounting member has a mounting plate engaging with a lower end of the receiving cylinder and a sleeve extending downwardly from the mounting plate.

9. The LED lamp as claimed in claim 6 further comprising a cover, wherein the cover is a frustum in shape and has an annular fixing flange formed at a lower edge thereof, the fixing flange engaging with the engaging flange of the base, the cover enclosing the heat sink and the LED modules therein.

10. An LED lamp comprising: a base having a base plate, an engaging flange extending upwards from an outer edge of a top surface of the base plate and a plurality of projecting vanes formed on a bottom surface of the base plate opposite to the engaging flange; a heat sink placed on the top surface of the base plate and surrounded by the engaging flange and comprising a core, a plurality of branches formed on the core and extending outwards from an outer circumference of the core and a plurality of fins formed on two opposite sides of each branch, each branch defining an inclined surface on a top thereof, a distance between the inclined surface and the core gradually increasing from a first end to a second end of the core, which is opposite to the first end of the core, wherein the fins are decreased in height along a direction outwards from the core and have top surfaces coplanar with the inclined surface; and an LED module having a printed circuit board mounted on the inclined surface of the each branch of the heat sink.

11. The LED lamp as claimed in claim 10, wherein the core is prism-shaped and has six sidewalls on the outer circumference thereof, the branches respectively extending perpendicularly from the sidewalls of the core.

12. The LED lamp as claimed in claim 10, wherein the each branch is a right-angled triangle in profile, and wherein the inclined surface is corresponding to a bevel edge of the triangle and inclined to the core with a same angle.

13. The LED lamp as claimed in claim 12, wherein the fins are increased in length along the direction outwards from the core and have bottom surfaces coplanar with a bottom surface of the core and bottom surfaces of the branches.

14. The LED lamp as claimed in claim 10, wherein the fins are perpendicular to the each branch and symmetrical to each other relative to the each branch.

15. The LED lamp as claimed in claim 10, wherein the base further comprises a receiving cylinder defining a receiving room therein and extending downwardly from a central portion of the bottom surface of the base plate, the projecting vanes extending radially outwardly from an outer circumference of the receiving cylinder.

16. The LED lamp as claimed in claim 15 further comprising a mounting member having a mounting plate engaging with a lower end of the receiving cylinder and a sleeve extending downwardly from the mounting plate.

17. The LED lamp as claimed in claim 15 further comprising a cover which is a frustum in shape and has an annular fixing flange formed at a lower edge thereof, the fixing flange engaging with the engaging flange of the base, the cover enclosing the heat sink and the LED modules therein.

18. The LED lamp as claimed in claim 10 wherein the core defines a hole therein along an axis thereof for facilitating an extension of the electrical wires to be electrically connected to the LED modules.

* * * * *